Oct. 27, 1959     J. E. HAWKINS     2,910,665
RADIO ACOUSTIC RANGING SYSTEM
Filed April 2, 1956
FIG. 1
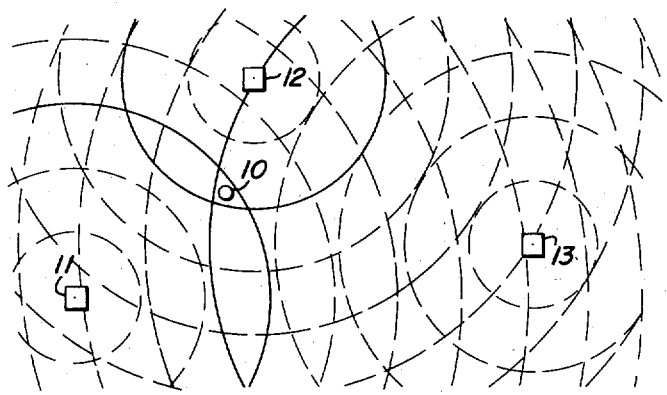
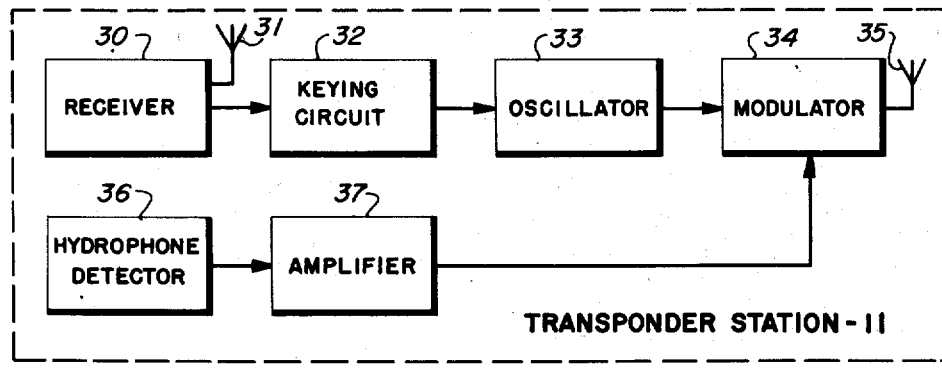
FIG. 2
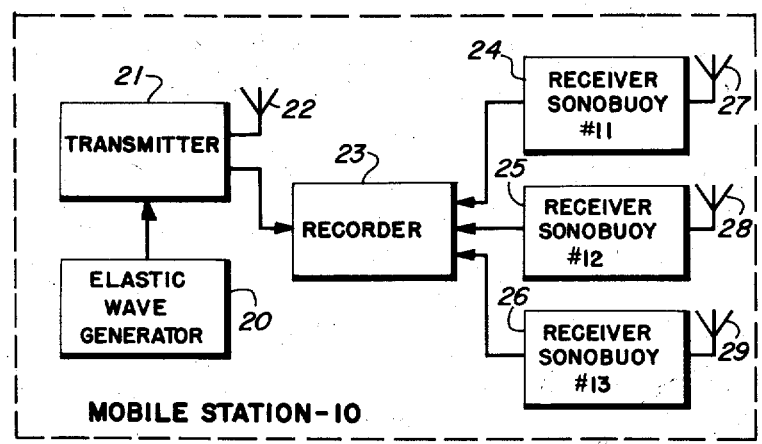
FIG. 3
INVENTOR
JAMES E. HAWKINS
BY
Mason, Kolehmainen, Rathburn and Wyss.
ATTORNEYS United States Patent Office 2,910,665
Patented Oct. 27, 1959

2,910,665

RADIO ACOUSTIC RANGING SYSTEM

James E. Hawkins, Broken Arrow, Okla., assignor to Seismograph Service Corporation, Tulsa, Okla., a corporation of Delaware Application April 2, 1956, Serial No. 575,473

8 Claims. (Cl. 340—2)

The present invention relates to a combined radio acoustic ranging system and, more particularly, to a new and improved system of this type for use over water covered areas to locate the position of a mobile station with respect to a plurality of spaced apart transponder stations.

In the most common type of radio acoustic ranging system presently in use, mobile stations transmit elastic waves through the water to suitable detectors located on spaced sonobuoy transponder stations. The instant of propagation of the elastic waves is recorded at the mobile station and coincides with the beginning of what may be referred to as a timing interval. The output signal of the elastic wave detector at each sonobuoy actuates a keying circuit employed to energize a wave signal generator for transmitting a radio frequency signal through the air back to the mobile station where the time of arrival of the radio frequency signal may be compared to the instant of propagation of the elastic waves.

If the velocity of propagation of the medium (water) through which the elastic waves are transmitted is known, the distance between the mobile and transponder stations may be readily calculated by measuring the time difference between the initiation of the elastic wave and the reception of the radio frequency signal, the transit time of the radio frequency signals being negligible because of the high velocity of propagation through air. Such a calculation actually indicates the radius of a circle having its center at the location of the sonobuoy and passing through the position of the mobile station. Obviously, by employing two spaced sonobuoys and making appropriate measurements and calculations, two such circles can be identified from which the position of the mobile station may be determined or, preferably, three such transponder stations may be employed to locate the position of the mobile station within a triangle of error.

Systems of this general type are characterized by a number of significant disadvantages. First, the sensitivity of the elastic wave detector must be adjusted so that the keying circuit, and hence the wave signal generator, will not be actuated by the impact of normal sea water disturbances or noises. However, when the detector is insensitive to the water noises, it frequently does not respond to the first few cycles of the so-called "first break signal" of the elastic wave energy but is instead actuated several cycles later when the elastic wave energy has built up to a sufficient level. An indeterminable time phase error dependent upon the sensitivity of the detector is thus introduced which decreases the accuracy of the measurements. Second, the time lapse introduced by each detector at the different transponder stations may not be uniform, first, because the build-up time and amount of elastic wave energy required to operate the different detectors is frequently not the same and, second, because the elastic wave energy arriving at each detector obviously varies as functions of the terrain of the water bed and of the distance between the detector and the source.

It would, therefore, be desirable to provide a radio acoustic ranging system including a mobile station and a plurality of transponder stations embodying means for improving the accuracy of measurements of the time difference between the generation of elastic wave energy and the arrival of the so-called first break signal of this energy at each of the transponder stations and the provision of such a system constitutes a principal object of the present invention.

Another object of the present invention is to provide an improved radio acoustic ranging system in which the aforementioned disadvantages inherent in the prior art systems are obviated.

A further object of the present invention is to provide a new and improved position determining system wherein the first break signal from an elastic wave source located at a mobile station is detected at each of a plurality of transponder stations and is transmitted back to the mobile station as a modulation component upon a carrier wave radiated from the transponder in order to obtain a position fix of the mobile station relative to the transponder stations.

A still further object of the present invention is to provide a new and improved position determining system wherein a pulse is radiated from a mobile station simultaneously with the propagation of elastic wave energy and this pulse is employed to render the transponder stations capable of relaying back to the mobile station detected disturbances resulting from the reception of said elastic wave energy.

Still another object of the present invention is to provide a position determining system adapted to assure that elastic wave energy generated at a mobile station is properly detected at a plurality of transponder stations and the detected information is transmitted back to the mobile station as a modulation component upon a space radiated carrier wave in order to determine the transit time of the elastic waves between the mobile station and each of the plurality of transponder stations, thereby to locate the position of said mobile station relative to said transponder stations.

It is also an object of the present invention to provide a position determining system in which a mobile station is geometrically oriented with respect to a plurality of transponder stations by simultaneous transmission of both elastic wave energy and wave signal pulses from the mobile station both of which are detected by appropriate means at each transponder station, with the pulses being used to trigger a carrier wave generator and the elastic wave energy being modulated upon the carrier wave for transmission back to the mobile station.

The invention, both as to its organization and method of operation, together with further objects and advantages thereof, will best be understood by reference to the specification taken in conjunction with the accompanying drawing in which:

Fig. 1 is a diagrammatic view of of a position determining system embodying the features of the present invention; and Figs. 2 and 3 are diagrammatic views illustrating the equipment employed in the system shown in Fig. 1, with Fig. 2 illustrating a typical transponder station and Fig. 3 illustrating a mobile station.

To achieve the above-enumerated and other objects, there is provided, in accordance with the present invention, a system for determining the position of a mobile station relative to a plurality of fixedly positioned and spaced apart transponder stations. In operation, both elastic waves and wave signal pulses are transmitted simultaneously from the mobile station for reception by suitable detectors at each of the transponder stations. The received wave signal pulses are utilized to excite a keying circuit which, in turn, actuates a carrier wave generator and its associated modulator circuit. The elastic wave energy, which is detected simultaneously with sea noises and the like, is amplified and modulated upon the output signal of the carrier wave generator. The resultant transponder signal, comprising a modulated carrier wave signal, is transmitted back to the mobile station where the modulation components are detected and recorded. Manifestly, the oscillator of each transponder station is tuned to a different frequency so that the radiated signals may be selectively received and separated at the mobile station by separate, correspondingly tuned, receivers. Since all of the arriving elastic wave energy having an amplitude in excess of the prevalent noise level is detected at each transponder station and modulated upon the radiated carrier wave, the first break signal of the elastic energy can be easily distinguished from the noise when the modulated wave is detected at the mobile station and the time interval between its arrival and the generation of the elastic wave energy can be measured.

As is well known, a determination of the latter time interval permits computation of the distances between the mobile station and each of the transponder stations with the result that the mobile station may be geometrically located relative to the known positions of the transponder stations.

Referring now to the drawing, and in particular to Fig. 1 thereof, there is illustrated a combined radio acoustic ranging system for use over a water covered area and embodying a mobile station 10 and a plurality of spaced apart, fixedly positioned transponder stations 11, 12 and 13. While three transponder stations are illustrated in Fig. 1, it will be apparent from the ensuing description that the system may be set up using only two such stations, if desired. The mobile station 10 may be carried on or within a ship, submarine or other maritime vessel having a need for position information for use in navigation or other position determining operations. The equipment comprising each of the transponder stations may either be housed within a sonobuoy suitably anchored to the bed of a body of water or may be encased within a housing mounted upon a drill rig or similar tower structure built on the bed of the body of water. When the transponder is used on the latter type structure, the transmitting antenna may be mounted at a higher distance above the water surface with a consequent increase in the operating range of the system. In any event, the transponder stations are so anchored that they are not dragged by wind, waves or tide action.

To obtain a position fix of the mobile station relative to the transponder stations 11, 12 and 13, the distance from each of the transponder stations to the mobile station may be determined by the equipment described below. Each distance determination is a measurement of the radius of the arc of a circle centered at the transponder station and passing through the position of the mobile station. As is well known, if two transponder stations are used, a pair of intersecting arcs is identified. These intersecting arcs do not provide an absolute position determination since they are ambiguous, in the sense that each pair of arcs, except for the unusual case of tangential intersection, intersect at two spaced apart positions, thus indicating two possible locations for the mobile station. If the approximate location of the mobile station is known prior to or during the distance measurements, the correct location may, of course, be ascertained by eliminating one of the two ambiguous intersections. Moreover, if three transponder stations are employed, the position of the mobile station is definitely fixed within a triangle of error having an area commensurate with the accuracy of the measurements effected by the position determining system.

Referring now to Fig. 3, there is illustrated in block diagram form the equipment comprising the mobile station 10. This equipment includes an elastic wave or sonic vibration generator 20 for generating intermittently elastic wave energy or sonic vibrations which are transmitted through the water to the transponder stations 11, 12, 13. The generator 20 may comprise any of the well known sonic generating devices best adapted to transmit elastic waves through water. Simultaneously with the generation of the elastic wave energy, the generator 20 energizes a wave signal generator or radio frequency transmitter 21 to radiate a burst or pulse of radio frequency energy via an antenna system 22. Thus, in accordance with an important feature of the present invention, both elastic wave energy and a wave signal pulse are simultaneously transmitted to the transponder stations with the elastic wave energy traveling through the relatively high density water and the radio frequency pulse passing, of course, through atmosphere. To provide a time reference, either a small portion of the wave signal pulse or a small amount of the elastic wave energy may be recorded on a suitable medium by means of a recorder 23. The recorder 23 also records the output of a plurality of receivers 24, 25 and 26 tuned to receive signals from the transponder stations 11, 12 and 13, respectively, as described hereinafter.

Referring now to Fig. 2, there is illustrated the equipment constituting one of the transponder stations, for example, the transponder station 11. It will be appreciated that because of the different velocities of propagation of water and air, the radio frequency pulse from the mobile station arrives at the transponder stations in advance of the arrival of the elastic wave energy. The earlier arriving pulse is received by a suitable radio frequency receiver 30 and its associated receiving antenna system 31, which receiver is, of course, tuned to the frequency of the pulse. The receiver is continuously energized by a power source (not shown) at the transponder station and, hence, is at all times conditioned to receive the radio frequency pulses from the mobile station. The output signal of the receiver 30 energizes a keying circuit 32 which may comprise a triggered, single shot, multivibrator or other conventional circuit for generating a square wave gating pulse in response to an appropriate signal from the receiver. The circuit parameters of the keying circuit are, of course, selected to provide a gating pulse of proper width which functions to energize a normally inoperative oscillator 33 for generating a signal having a preselected radio frequency. The latter signal may be applied to a modulator 34 in order to superimpose thereon the low frequency elastic wave energy received from the mobile station. The oscillator 33 and its associated modulator 34, taken together, may be referred to as a transponder wave signal generator or as a normally inoperative transmitter. The modulated output signal of the transmitters is radiated to the mobile station 10 by an emitting antenna system 35 where it is accepted by the receiver 24 center tuned to a frequency corresponding to that of the oscillator 33.

In order to avoid delay between the arrival of the radio frequency pulse from the mobile station and the radiation of signals from the antenna system 35, the vacuum tubes embodied in the keying circuit 32, the oscillator circuit 33 and the modulator 34 may be maintained in standby condition as by keeping their filaments heated. The gating pulse may then be employed to overcome cutoff bias on the oscillator 33 or in any other manner to insure operation of the oscillator instantaneously with the application of the gating pulse. It will be appreciated that the oscillator 33 remains energized to induce radiation of the modulated signal from the transponder throughout the gating pulse interval only.

In order to receive the elastic wave energy created by the generator 20 at the mobile station, there is provided at the transponder station a hydrophone detector 36 which converts the mechanical energy of the elastic waves or sonic vibrations into electrical signals suitable for amplification by an amplifier 37. The output of the latter amplifier is fed into the modulator 34 where it is amplitude modulated upon the signal generated by the oscillator 33.

It will be understood, as indicated above, that the wave signal pulse from the mobile station, which arrives at the transponder station prior to the initial arrival of any of the elastic wave energy, is employed to trigger a gating circuit for rendering the transponder transmitter operative. Subsequent to the generation of the gating pulse by the keying circuit 32 and prior to the initial arrival of the elastic wave energy, the output signal of the oscillator 33 is modulated by relatively small amplitude signals developed by the hydrophone due to the normal sporadic sea water noises. This noise modulation is, of course, reproduced by the receiver 24 at the mobile station and is recorded in the manner previously described. At the instant of arrival of the first break signal it may be said that the transponder station is "conditioned" to receive and accurately detect the precise instant of arrival of the first break signal of the elastic wave energy, i.e., the signal transmitted directly through the water medium without reflection from the bed of the body of water or the subterranean interfaces.

If a sporadic sea noise occurs at substantially the moment of arrival of the first break signal, the instant of arrival of the first break signal can be determined to a fair degree of accuracy by observing the energy build-up portion of the sonic vibrations. In this connection, it will be understood that the gating pulse from the keying circuit 32 is of sufficient width to permit arrival of all of the generated elastic wave energy at the transponder station most remote from the mobile station, thus insuring that none of the intelligence will be lost by cutting off the transmitting portions of the transponder circuits.

The transponder stations 12 and 13 are, of course, similar to the transponder station 11 just described and differ therefrom solely to the extent that their oscillators are tuned to different and distinguishable freqencies. Thus, the carrier waves radiated from the stations 11, 12 and 13 are distinct and may be selectively received by the receivers 24, 25 and 26, respectively, at the mobile station 10. The latter receivers are, of course, so tuned and are sufficiently selective that each will receive only one of the radiated carrier waves and will reject the other two. An analysis of the record permits a determination of the time difference between the instant of initiation of the radio frequency pulse at the mobile station and the initial instant of arrival of the first break of the elastic wave energy at each of the transponder stations, the transit times of the radio frequency pulse from transmitter 21 and of the modulated carrier wave from each transponder station being considered negligible because of the high velocity of propagation of radio frequency signals through air as compared to the extremely low velocity of propagation of the sonic vibrations through water. By employing the known velocity of propagation of the elastic waves through water, the time difference thus determined may be expressed in terms of distance. As a matter of fact, the scale of the record may be so calibrated that distance measurements are obtained directly from the recorded indications. Any variations in the velocity of propagation of the medium through which the sonic vibrations pass may then be compensated for by altering the speed of travel of the recording medium so that true distance measurements are always obtained.

The distance measurements may then be transferred to a chart, by striking or constructing a plurality of arcs having their respective centers at the transponder stations and having radii corresponding to the measured distances. The intersection of these arcs, as is indicated by the solid lines in Fig. 1, defines a triangle of error within which the mobile station is located. The area of the triangle of error is, of course, a function of the accuracy of the distance measurements and, in accordance with the present invention, is relatively small. To aid in the construction of the aforementioned intersecting arcs, each of the transponder station locations on the chart may, if desired, be surrounded by a plurality of equidistantly spaced concentric, circular lines each representative of a different distance from the mobile station to the transponder station, these circles being represented by broken lines in Fig. 1.

While a particular embodiment of the invention has been shown, it will be understood, of course, that the invention is not limited thereto since many modifications may be made and it is, therefore, contemplated by the appended claims to cover any such modifications as fall within the true spirit and scope of the invention.

What is claimed as new and desired to be secured by Letters Patent is:

1. In a radio acoustic ranging system for determining the distance between a mobile station and a transponder station, the combination of separate means for respectively transmitting a space radiated signal and sonic vibrations from said mobile station to said transponder station, means at said transponder station for detecting the sonic vibrations, a normally inoperative transmitter at said transponder station and effective when operative to transmit a wave to said mobile station, means at the transponder station for receiving the space radiated signal, means responsive to the received space radiated signal for rendering and maintaining said transmitter operative until the arrival of the sonic vibrations at said detecting means, and means responsive to the sonic vibrations for measuring the time interval between the transmission of the sonic vibrations and their arrival at the detecting means in order to determine the range from the mobile station to the transponder station.

2. In a radio acoustic ranging system for determining the distance between a mobile station and a transponder station, the combination of separate means for respectively transmitting a space radiated signal and sonic vibrations from said mobile station to said transponder station, means at said transponder station for detecting the sonic vibrations, a normally inoperative transmitter at said transponder station and effective when operative to transmit a wave to said mobile station, means responsive to said space radiated signal for rendering and maintaining said transmitter operative until the arrival of the sonic vibrations at said detecting means, means for modulating the wave radiated by said transmitter with the detected vibrations, and means at the mobile station for detecting the modulated wave from the transmitter for comparison with the time of initiation of the sonic vibrations to determine the range between the mobile station and the transponder station.

3. A radio acoustic ranging system for determining the distance between a mobile station and each of a plurality of transponder stations comprising separate means for respectively transmitting a space radiated signal and sonic vibrations from said mobile station to each of said transponder stations, a normally inoperative transmitter at each of said transponder stations and effective when operative to transmit a wave to said mobile station, means at each of said transponder stations responsive to said space radiated signal for rendering and maintaining said transmitters operative until the arrival of the sonic vibrations at said transponder stations and means for detecting the wave radiated from each transponder station for comparison with the time of initiation of the sonic vibrations to determine the location of the mobile station.

4. A radio acoustic ranging system operable over water covered areas for determining the distance between a mobile station and each of a plurality of transponder stations comprising separate means for respectively transmitting in fixed timed relationship a space radiated signal and sonic vibrations from said mobile station to said transponder stations, normally inoperative transmitters at said transponder stations and effective when operative to transmit waves to said mobile station, means responsive to said space radiated signal for rendering and maintaining said transmitters operative until the arrival of the sonic vibrations at said transponder stations, and means for determining the time difference between the generation of the sonic vibrations and their arrival at each of said transponder stations.

5. In a radio acoustic ranging system for determining the distance between a mobile station and a plurality of transponder stations, the combination of separate means for respectively transmitting in fixed timed relationship a space radiated signal and sonic vibrations from said mobile station to each of said transponder stations, a normally inoperative transmitter at each of said transponder stations and effective when operative to transmit a wave to said mobile station, means at each of said transponder stations responsive to sonic vibrations for developing electrical energy, means at each of said transponder stations for respectively modulating the wave radiated thereby with said electrical energy, means at each of said transponder stations responsive to said space radiated signal for rendering and maintaining said transmitter operative until the arrival of the sonic vibrations, and means at said mobile station for detecting said modulated waves and reproducing said electrical energy.

6. A radio acoustic system for use over water covered areas to determine the location of a mobile station with respect to a plurality of spaced apart transponder stations comprising separate means for transmitting a space radiated pulse and generating sonic vibrations, a transmitter at each of said transponder stations, the transmitters at the respective transponder stations being operable to radiate waves of distinguishable frequency, means at each of said transponder stations responsive to said pulse for developing a control signal to render operative the transmitter at the associated transponder station, means at each transponder station for detecting the sonic vibrations, means for modulating the detected vibrations upon the wave radiated from the associated transponder station, receiving means for separating the distinguishable frequencies of the waves radiated by said transponder stations and for detecting the modulation components appearing on said waves, and means for recording an impulse at the instant of generation of the sonic vibrations and for also recording signals corresponding to the detected modulation components.

7. A radio acoustic system for use over water covered areas to determine the location of a mobile station with respect to a plurality of fixedly positioned spaced apart transponder stations comprising separate means for transmitting a space radiated pulse and generating sonic vibrations in the water, a transmitter at each of said transponder stations, the transmitters at the respective transponder stations being operable to radiate waves, means at each of said transponder stations responsive to said pulse for developing a control signal to render operative the transmitter at the associated transponder station, means at each transponder station for detecting the sonic vibrations, means for modulating the detected vibrations upon the wave radiated from the associated transponder station, receiving means at the mobile station for detecting the modulation components appearing on the waves radiated by said transponder stations, and means for recording an impulse at the instant of generation of the sonic vibrations and for also recording signals corresponding to the detected modulation components at the instant of arrival at the mobile station.

8. A radio acoustic system for use over water covered areas to determine the location of a mobile station with respect to a plurality of fixedly positioned spaced apart transponder stations comprising separate means for simultaneously transmitting a space radiated pulse and generating sonic vibrations in the water, a normally inoperative transmitter at each of said transponder stations, the transmitters at the respective transponder stations being effective when rendered operative to radiate carrier waves of distinguishable frequency, means at each of said transponder stations responsive to said pulse for developing a control signal, means responsive to said control signal for rendering operative the transmitter at the associated transponder station, means at each transponder station for detecting the sonic vibrations, means for modulating the detected vibrations upon the carrier wave radiated from the associated transponder station, a plurality of receiving means respectively responsive to the distinguishable frequencies of the carrier waves radiated by said transponder stations for detecting the modulation components appearing on said carrier waves, and means at the mobile station for recording both the instant of generation of the sonic vibrations and the time of arrival of the detected modulation components.

References Cited in the file of this patent

UNITED STATES PATENTS

| | | |
|---|---|---|
| 684,706 | Mundy | Oct. 15, 1901 |
| 913,528 | Marriott | Feb. 23, 1909 |
| 1,099,998 | Schlesser | June 6, 1914 |
| 2,326,880 | Norrman | Aug. 17, 1943 |
| 2,405,239 | Seeley | Aug. 6, 1946 |
| 2,431,018 | Bailey et al. | Nov. 18, 1947 |